May 13, 1958
S. D. WILTSE
2,834,618
FLUID SEAL FOR ROTARY SHAFTS
Filed May 21, 1953
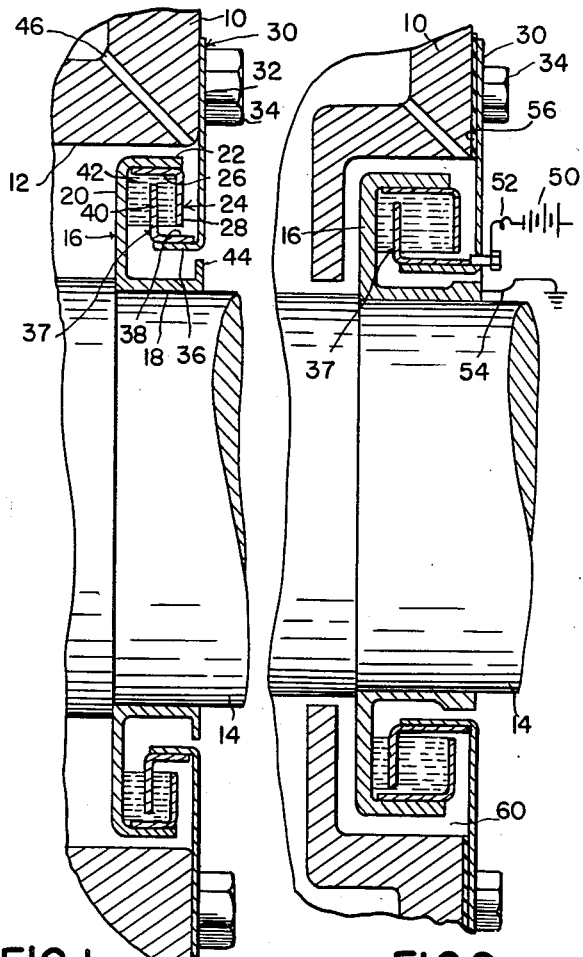
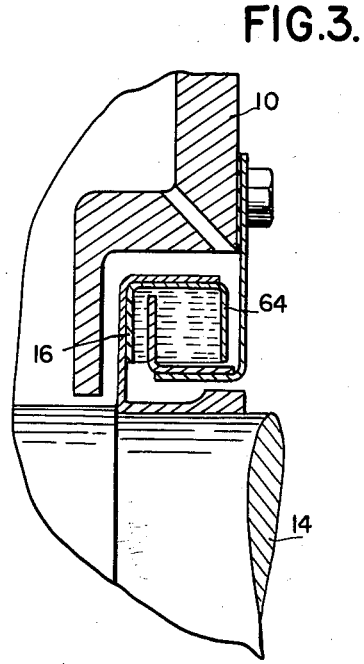
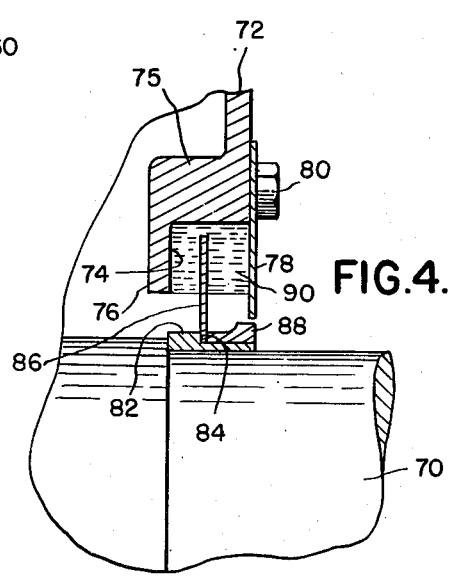
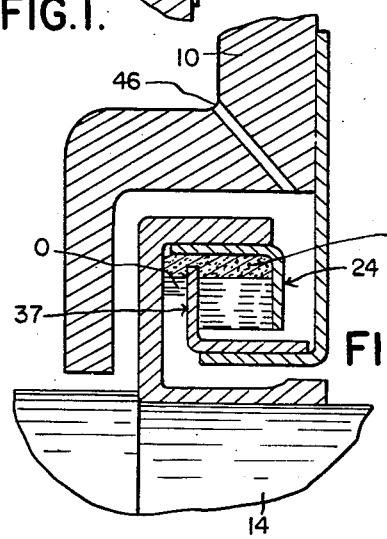
FIG.1. FIG.2. FIG.3. FIG.4. FIG.5.
INVENTOR.
SUMNER D. WILTSE
BY Whittemore,
Hulbert & Belknap
ATTORNEYS

2,834,618

FLUID SEAL FOR ROTARY SHAFTS

Sumner D. Wiltse, Detroit, Mich.

Application May 21, 1953, Serial No. 356,533

1 Claim. (Cl. 286—9)

The present invention relates to a shaft seal.

It is an object of the present invention to provide a shaft seal adapted to form a gas-tight seal between a relatively rotating shaft and member having an opening in which the shaft is located, characterized by the absence of metal-to-metal contact, and its ability to provide a seal between substantial pressure differences.

It is a further object of the present invention to provide a shaft seal including a radially inwardly open channel containing a fluid, and means for rotating the channel to establish centrifugal forces, in combination with a cooperating seal element including a flat annular portion extending radially outwardly into the channel, the channel containing a fluid into which the edge of the flat annular portion extends to provide a seal.

It is a further object of the present invention to provide a seal in which the fluid comprises an oil and preferably a silicone oil or silicone diester blend, and which may comprise in addition solid particulate materal such for example as powdered metal.

It is a further object of the present invention to provide a seal of the character described in the preceding paragraph in which the particulate material is magnetic, and in which the seal is provided with means for establishing magnetic lines of force between the flat annular portion and the adjacent inner surfaces of the channel.

Other objects and features of the invention will become apparent as the description proceeds, especially when taken in conjunction with the accompanying drawings, wherein:

Figure 1 is a side elevational view, partly in section, illustrating the sealing structure.

Figure 2 is a view similar to Figure 1 illustrating a somewhat different embodiment of the invention.

Figure 3 is a view similar to Figure 1 illustrating yet another embodiment of the invention.

Figure 4 is a view similar to Figure 1 illustrating yet another embodiment of the invention.

Figure 5 is an enlarged view showing the parts including the sealing material, in operation.

Referring now to the drawings, the invention is illustrated as applied to a stationary member 10 which may be a motor or engine housing having an opening 12 therein in which is located a rotary shaft 14. The invention finds particular utility in cases where high angular velocity of the shaft is anticipated. Secured to the shaft for rotation therewith is a seal rotor 16 including a cylindrical portion 18 which may be pressed upon the shaft in sealing relation therewith, a radially outwardly extending flange 20, and a cylindrically extending flange 22. Secured to the inner surface of the flange 22 is an annular member 24 including a cylindrical flange 26 and a radially extending flange 28. It will be observed that the flanges 20, 22, 26 and 28 together define a radially inwardly open channel mounted for rotation on the shaft and sealed thereto.

Carried by the housing 10 is the stator element 30 of the seal which comprises a flat annular plate 32 bolted or otherwise secured in sealing relation to the housing 10 as by the bolts 34. The stator element includes a cylindrical flange 36 extending axially into the space in the channel. Carried by the flange 36 is an annular member 37 including a cylindrical portion 38 and a flat annular portion 40. The flat annular portion 40 extends radially outwardly into the adjacent channel.

Located within the channel is a sealing fluid indicated at 42. In operation the sealing fluid is subjected to centrifugal force which at high angular velocities of the shaft may be of very considerable amount. The flat annular portion 40 extends into the fluid and provides an effective seal therewith. If a pressure differential exists at opposite sides of the seal, fluid will be displaced from one side of the flat annular portion 40 with a corresponding reduction in the mass of material, until the pressure is in balance, at the opposite side of the flat annular portion 40.

Preferably, the fluid in the channel seal comprises an oil. Inasmuch as in some instances the seal may be subjected to relatively high temperatures, it is preferred to employ a high temperature oil, such as silicone oils or silicone di-ester blends.

Inasmuch as the sealing effectiveness of the seal is dependent upon centrifugal force, it is of course apparent that the specific gravity of the fluid sealing material enters into its effectiveness. Thus for example, in some instances it may be possible to employ liquid mercury as the fluid seal and due to its high specific gravity the mercury will provide an effective seal for relatively high pressure differentials.

A finely powdered material such as metal which has the physical characteristics of a fluid under the operating conditions encountered may be employed. In such case, in order to increase the fluidity of the powdered material it is desirable to include a powdered solid lubricant such for example as graphite or molybdenum sulphide.

The effectiveness of the seal where oil is included, may be improved by including solid particulate matter in the fluid. This material may operate to improve the efficiency of the seal due to its greater specific gravity, and where reliance is placed upon its greater specific gravity only this solid material may be of any character compatible with the existing conditions. Thus for example, powdered copper may be employed.

However, the invention also contemplates as a specific improvement the use of a fluid including as the solid particulate matter therein a magnetic material such for example as powdered iron. In this case magnetic lines of force are established between the flat annular portion 40 and the adjacent inner surface of the channel. These lines of force may be established magnetically or electrically. Thus for example, the element including the cylindrical portion 38 and the flat annular portion 40 may be in the form of a permanent magnet having one pole constituted by the outer edge of the flat annular portion 40. If desired, the element 24 may also be in the form of a magnet having circular poles in which case the pole constituted by the flange portion 26 will be of opposite polarity with respect to the pole at the edge of the flat annular portion 40.

As is well understood, a fluid such for example as oil containing particles of magnetic material undergoes rather surprising physical transformation when subjected to magnetic lines of force. In this case the entire material becomes a flowable plastic mass and thus is adapted to be affected by centrifugal force to provide an effective seal.

The seal rotor 16 includes a relatively short outwardly projecting annular flange 44 which defines with the flange 20 a radially outward channel in which the sealing fluid is guided as it drains downwardly when the shaft rotation stops, in the event that the fluid is not maintained in position as a result of the action of magnetic lines of force.

It is contemplated that additional oil will be supplied to the seal, the housing 10 being provided with a passage 46 for this purpose.

Referring now to Figure 2 there is illustrated a similar arrangement which differs from that previously described primarily in that there is diagrammatically illustrated an electrical source 50 connected by a conductor 52 to the member 37. The seal rotor 16 is illustrated at 54 as connected to ground, this connection of course being purely diagrammatic inasmuch as the shaft will normally be grounded as a result of the machine assembly. The figure also illustrates the element 30 as insulated from the housing 10 by an annular insulating disc 56, and also suitable insulation for the bolts 34. In this figure it is also apparent that an oil trap 60 is provided by the defined construction.

Referring now to Figure 3 there is illustrated a generally similar arrangement which in this case differs specifically from the embodiments previously described in that an annular element 64 is carried by the seal rotor 16, the annular element in this instance being of radially inwardly open channel shaped cross-section.

Referring now to Figure 4 there is illustrated an arrangement in which a shaft 70 is stationary and has associated therewith a rotary housing 72. In this case the fluid receiving channel 74 is provided on the rotating housing, and specifically in this instance, by a thickened bead 75 and a radially inwardly extending flange 76 at one side thereof. Secured to the housing 72 is a flat annular plate 78 illustrated as bolted or otherwise secured to the housing at 80.

In this case the shaft 70 has secured thereto a sleeve 82 provided with a shoulder 84 against which is mounted a flat annular element 86 which is retained in position by a ring 88.

Inasmuch as the housing is the rotary element rotation thereof develops centrifugal force in the fluid sealing material indicated at 90. The radially outwardly extending flat annular element 86 extends into the fluid sealing material and centrifugal force developed therein by rotation of the housing opposes displacement of the fluid from either side of the element 86 as is obvious.

It will be understood that in this case the fluid plastic material may be a hydraulic liquid, liquid metal such as mercury, oil such as silicone oil, a powdered solid material, or as is ordinarily preferred, a mixture of oil and solid particulate material such for example as powdered metal. It will also of course be understood that the solid particles may be magnetic such for example as powdered iron or magnetic alloys, in which case means are associated with the seal elements to establish magnetic lines of force extending between the flat annular element 86 and the adjacent surface of the channel 74. Again, these magnetic lines of force may be established by making one or both of the seal elements permanent magnets or by impressing an electrical potential across the space between these elements.

In all cases the seal is effected by a pair of relatively rotating elements, the rotary one of which is in channel form and adapted to receive a flowable fluid material. This fluid material may be a plastic mass or a true liquid.

It will be understood that in operation relative movement between the shaft and housing occurs in a direction longitudinally of the shaft and the seal structure is designed to accommodate such movement without affecting the seal. The distance between the side walls of the channel element of the seal of course determines the amount of relative longitudinal movement permitted between the shaft and housing. The sealing material may thus be a mixture of oil and powdered metal, or metalloid such as silicone oils or silicone di-ester oil blends and molybdenum di-sulphide. Centrifugal forces acting on the sealing material imposes considerable pressure thereon in proportion to the rotative speed of the channel and the density of the material. Employing silicone oil and powdered metal a specific gravity of about 7 to 9 results in the outer area containing the tightly packed particulate material, but if mercury is employed as the sealing material its relatively greater specific gravity of 13.5 renders the seal effective against higher pressure.

In operation the seal rotor channel turns at high speed and this speed throws the sealing material outwardly and by centrifugal force the sealing material is subjected to considerable pressure. The flat annular portion of the stationary element of the seal is positioned within the channel and the sealing material moves or flows freely around its outer edge as is required upon relative axial movement of the shaft or displacement of the sealing fluid by pressure differential. In the absence of a pressure differential the level of the sealing material within the channel will be equal at opposite sides of the stationary flat annular element or portion. However, when pressure on one side of the seal is higher than the opposite side, an amount of sealing fluid will be displaced radially until the balance of the system is established in equilibrium. When the engine is stopped the sealing material is not subjected to pressure and gutters are provided in the design to trap any of the sealing fluid flowing downwardly by gravity and thus to prevent loss of such fluid. Moreover, means are provided for supplying additional oil or sealing fluid to the seal and in operation this may be a continuous supply so that a flow of sealing fluid through the seal takes place continuously, thus providing a continuous cooling effect.

Referring now to Figure 5 there is illustrated the manner in which the sealing material functions in operation. In this figure the channel 24 is shown as provided with sealing material, which in this instance is an oil including solid particulate material. Under high speed operation, centrifugal separation between the oil and particulate material takes place, the oil being illustrated at O and the solid particulate material being illustrated at P. The solid particulate material being relatively denser than the oil, is packed in the bottom or outer part of the channel. The outer edge of the flat annular portion 37 thus rotates in a mass of closely packed solid particulate material and forms its own channel therein.

In Figure 5 it will be noted that the flat annular portion 37 is illustrated as relatively close to the left hand side of the channel and it is assumed that the seal is operating between a relatively high pressure at the left of the seal and a relatively low pressure at the right of the seal. Under these circumstances the pressure differential has displaced sealing material from the left of the flat annular portion 37 radially outwardly and around the outer edge of the flat annular portion 37. At this time the relatively higher column of sealing material at the right of the flat annular portion 37 develops forces by centrifugal action which are effective to balance the relatively shorter column of sealing material at the left of the portion 37 as well as the pressure differential at opposite sides of the seal.

One of the important advantages of the present invention is that a perfect gas-tight seal effective to withstand very considerable pressure differentials is provided without any metal-to-metal or solid-to-solid contact.

The operation may be visualized as providing a flat annular blade immersed in a sealing material retained in a radially inwardly open channel rotated at high speeds. Inasmuch as the sealing material is flowable, relative axial movement of the parts is freely permitted without affecting the seal.

The metal powder when employed in the mixture may be extremely fine in particle size and further reduction in particle size from operation does not reduce the efficiency of the seal.

The particular dimensions shown herein are merely for the purpose of illustrating the operation of the device. It will be apparent of course that to withstand higher pressures it may be desirable in some cases to displace the seal radially outwardly so as to increase its radius of gyration, and thereby to increase the centrifugal force resulting from any rotational speed of the shaft. In the same manner, the ability of the seal to withstand greater pressures may be accomplished by providing a relatively deeper channel section so as to permit a greater mass of sealing material at one side of the flat annular portion or element to counterbalance fluid pressure at the other side thereof.

The drawings and the foregoing specification constitute a description of the improved shaft in such full, clear, concise and exact terms as to enable any person skilled in the art to practice the invention, the scope of which is indicated by the appended claim.

What I claim as my invention is:

High temperature seal structure for sealing the space between a stationary member having an opening and a rotary shaft in said opening, said structure comprising a radially inwardly open annular channel carried by and surrounding said shaft and sealed thereto, an annular member surrounding said shaft and carried by and sealed to said stationary member, said annular member having a continuous flat annular portion received in said annular channel and extending radially outwardly therein to be closely adjacent to the bottom of said annular channel, and a fluid sealing material in said annular channel in which the outer edge of said flat annular portion is received, said fluid sealing material comprising a mixture of a silicone oil and powdered molybdenum di-sulphide, said seal when said shaft is rotating at high speeds comprising centrifugally separated powdered molybdenum di-sulphide at the bottom of said channel in which the edge of said flat annular portion is received, and a radially inwardly located cover of said silicone oil, said oil forming a liquid seal over and throughout said powder.

References Cited in the file of this patent

UNITED STATES PATENTS

| | | |
|---|---|---|
| 1,014,850 | Richardson | Jan. 16, 1912 |
| 2,262,687 | Little | Nov. 11, 1941 |
| 2,557,140 | Razdowitz | June 19, 1951 |
| 2,600,321 | Pyle | June 10, 1952 |
| 2,606,044 | Allen et al. | Aug. 5, 1952 |
| 2,644,804 | Rubin | July 7, 1953 |
| 2,665,929 | Sawyer | Jan. 12, 1954 |

FOREIGN PATENTS

| | | |
|---|---|---|
| 656,713 | Great Britain | Aug. 29, 1951 |